US012767174B2

(12) United States Patent
Hariharan et al.

(10) Patent No.: US 12,767,174 B2
(45) Date of Patent: Oct. 20, 2026

(54) PROCESSOR-BASED SYSTEM EMPLOYING A SAFETY ISLAND ARCHITECTURE FOR FAIL-SAFE OPERATION

(71) Applicant: QUALCOMM Incorporated, San Diego, CA (US)

(72) Inventors: Sriram Hariharan, San Diego, CA (US); Bohuslav Rychlik, San Diego, CA (US); Deepak Baranwal, Greater Noida (IN); Vinay Kumar Garipelli, Bangalore (IN); Amod Phadke, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 587 days.

(21) Appl. No.: 18/193,912

(22) Filed: Mar. 31, 2023

(65) Prior Publication Data

US 2024/0326867 A1 Oct. 3, 2024

(51) Int. Cl.
*B60W 60/00* (2020.01)
*B60W 50/02* (2012.01)
(Continued)

(52) U.S. Cl.
CPC ........ *B60W 60/0015* (2020.02); *B60W 50/02* (2013.01); *B60W 50/045* (2013.01);
(Continued)

(58) Field of Classification Search
CPC ......... B60W 60/0015; B60W 60/0018; B60W 60/00186; B60W 60/00188;
(Continued)

(56) References Cited

U.S. PATENT DOCUMENTS 6,201,997 B1 * 3/2001 Giers ................. G05B 19/0421 700/111
2011/0257833 A1 * 10/2011 Trush ................... G07C 5/0808 701/31.4

(Continued)

FOREIGN PATENT DOCUMENTS

EP 3869338 A1 8/2021
WO 2023009559 A1 2/2023

OTHER PUBLICATIONS

Texas Instruments ("TDA4VM Jacinto Processors for ADAS and Autonomous Vehicles Silicon Revisions 1.0 and 1.1," Feb. 2019, Texas Instruments (Year: 2019).*

(Continued)

*Primary Examiner* — Sara J Lewandroski
(74) *Attorney, Agent, or Firm* — W&T

(57) ABSTRACT

A processor-based system employing a safety island architecture for fail-safe operation and related methods are disclosed. The processor-based system includes a main domain for controlling a device. The main domain receives and processes vehicle information from a vehicle network. The main domain communicates with vehicle modules to control operation of the vehicle. Such operation may include different autonomous driving use cases. The processing system includes a safety island domain that includes less hardware circuits as in the main domain. The safety island domain is (Continued)

configured to checkpoint vehicle information processed by both the main and safety island domains and to monitor errors originating in both the main and safety island.

38 Claims, 6 Drawing Sheets

(51) Int. Cl.

| | |
|---|---|
| ***B60W 50/04*** | (2006.01) |
| ***G06F 11/08*** | (2006.01) |
| ***G07C 5/00*** | (2006.01) |
| *B60W 50/035* | (2012.01) |
| *G06F 11/16* | (2006.01) |

(52) U.S. Cl.
CPC ........... *G06F 11/08* (2013.01); *B60W 50/035* (2013.01); *B60W 60/007* (2020.02); *G06F 11/1629* (2013.01)

(58) Field of Classification Search
CPC .... B60W 60/007; B60W 20/50; B60W 20/02; B60W 20/0205; B60W 20/0225; B60W 20/023; B60W 20/029; B60W 20/035; B60W 20/04; B60W 20/045; B60W 2050/021; B60W 2050/0292; B60W 2050/0295; B60W 2050/0297; G06F 11/00; G06F 11/07; G06F 11/0796; G06F 11/08; G06F 11/14; G06F 11/16; G06F 11/1608; G06F 11/1629; G06F 11/1633; G06F 11/1637; G06F 11/1641; G06F 11/1645; G06F 11/165; G06F 11/1654; G06F 11/30; G06F 11/3003; G06F 11/3013
See application file for complete search history.

(56) References Cited

U.S. PATENT DOCUMENTS

| | | | | |
|---|---|---|---|---|
| 2017/0277607 | A1* | 9/2017 | Samii | G06F 11/2033 |
| 2019/0236865 | A1 | 8/2019 | Mercep et al. | |
| 2019/0258251 | A1* | 8/2019 | Ditty | B60W 50/023 |
| 2020/0039530 | A1* | 2/2020 | Smolyansky | G06F 11/16 |
| 2020/0278395 | A1* | 9/2020 | Herd | G01R 31/31724 |
| 2021/0019240 | A1* | 1/2021 | Geng | G06F 11/0793 |
| 2021/0203979 | A1* | 7/2021 | Dubey | G01S 17/931 |
| 2021/0208189 | A1* | 7/2021 | Flores | G01R 31/2803 |
| 2021/0247743 | A1 | 8/2021 | Raj et al. | |
| 2023/0032305 | A1* | 2/2023 | Krishnani | G06F 11/0772 |
| 2023/0036117 | A1* | 2/2023 | Krishnani | G06F 11/0757 |
| 2024/0142518 | A1* | 5/2024 | Mcnairy | G01R 31/31726 |

OTHER PUBLICATIONS

Silva et al., Special Session: AutoSoC—A Suite of Open-Source Automotive SoC Benchmarks, 2020, IEEE (Year: 2020).*

AutoSAR, Explanation of Safety Overview, 2018, AutoSAR (Year: 2018).*

Kumar, The state of functional safety in Industry 4.0, Dec. 2018, Texas Instruments (Year: 2018).*

EDN, Redundancy for safety-compliant automotive & other devices Mar. 12, 2014, EDN, https://www.edn.com/redundancy-for-safety-compliant-automotive-other-devices/ (Year: 2014).*

International Search Report and Written Opinion for International Patent Application No. PCT/US2024/013997, mailed Jun. 12, 2024, 14 pages.

Bernon-Enjalbert, V. et al., "Safety-Integrated Hardware Solutions to Support ASIL-D Applications," White Paper, Document No. FUNCSAFTASILDWP Rev 1, 2013, Freescale Semiconductor, Inc., 9 pages.

* cited by examiner

500

| | ERROR DESCRIPTION (502) | FAULT CLASS (504) | SAFETY ISLAND ACTIONS (506) |
|---|---|---|---|
| 508 | MD System/Secure Watch Dog Expiration or CPU core hang detected | MD Non-fatal Fault | SAIL Island Mode & MD Reset |
| | MD TSENSE fatal error – Temperature runaway | MD Non-fatal Fault | SAIL Island Mode & MD Reset |
| | MD Functional IP SS crash (Camera sensors, GPU sensors, etc.) | MD Non-fatal Fault | SAIL Software decides the criticality and pushes SAIL to Island Mode if needed |
| | Other MD recoverable faults (ECC error, etc.) | MD Non-fatal Fault | SAIL Software decides the criticality and pushes SAIL to Island Mode if needed |
| 510 | MD Fatal Error (voltage monitor error, bus hang, etc.) | MD Fatal Fault | SAIL Island Mode & MD Reset |
| 512 | SAIL Pwr Sequencer Watch Dog Timer Expired | SAIL Fatal Fault | SoC full chip reset |
| | Watch Dog expired or core hang detected for all critical cores in SAIL | SAIL Fatal Fault | SoC full chip reset |
| | SAIL Temperature fatal error – temperature runaway | SAIL Fatal Fault | SoC full chip reset |
| | Other SAIL fatal safety errors (voltage monitor error, bus hang, etc.) | SAIL Fatal Fault | SoC full chip reset |
| 514 | Single Watch Dog expired or core hang detected for non-critical core in SAIL | SAIL Non-fatal Fault | Remaining cores will try to recover the hang detected core |
| | Other SAIL recoverable faults (ECC error, etc.) | SAIL Non-fatal Fault | SAIL will try to recover |

FIG. 5

PROCESSOR-BASED SYSTEM EMPLOYING A SAFETY ISLAND ARCHITECTURE FOR FAIL-SAFE OPERATION

BACKGROUND

I. Field of the Disclosure

The technology of the disclosure relates generally to safety island architecture and more particularly, a System on Chip (SoC) having a safety island domain for controlling safe operation of a vehicle.

II. Background

Autonomous driving hardware is required to support various safety levels of operation of a vehicle. Automotive Safety Integrity Level (ASIL) is a standard risk classification scheme defined by ISO 26262 which defines the various safety levels of operation of a vehicle. Currently, ASIL-A through ASIL-D levels are defined whereby ASIL-D specifies the highest integrity requirements necessary for a product to be compliant. In particular, ASIL-D requires that System on a Chip (SoC) implementations move a vehicle to a minimum safe operating mode on detection of any safety critical functional fault in the SoC. For example, a SoC must ensure safe operation of a vehicle (e.g., safe mode) by safe parking if a safety error occurs when the vehicle is currently utilizing adaptive cruise control or autonomous self-driving. In another example, if any safety error occurs when the vehicle is in parking mode, the SoC needs to switch off and restart. And in another example, if any safety error occurs in the SoC while the ignition is turned on, the vehicle should not start or restart.

SUMMARY

Aspects disclosed in the detailed description include a processor-based system employing a safety island architecture for fail-safe operation. The processor-based system may be included in a system-on-a chip (SoC) that includes one or more processors and other processor related peripherals, including input/output (I/O) interfaces and memory.

In one aspect, the processor-based system includes a main domain for controlling a device, such as a vehicle. The main domain includes a first processor and other hardware circuits used to monitor vehicle sensors on the vehicle such as cameras, speed sensors, location sensors and the like as well as system sensors in the main domain including voltage sensors, temperature sensors, watch dog timers, aging sensors and the like. The other hardware circuits rapidly process the information from the vehicle sensors utilizing techniques such as computer vision to determine objects in the vehicle's periphery. The main domain communicates with vehicle modules including electromechanical modules to control operation of the vehicle. Such operation may include different autonomous driving use cases including autonomous cruise control, navigating the vehicle to certain destinations, autonomous parking and autonomous driving until summoned to avoid parking, and the like. Thus, it is important that these critical systems continue to operate in a fail-safe manner if the main domain were to incur a fault or failure.

As the amount of hardware circuitry increases in a SoC, the size of the SoC increases. In order to maintain a fixed SoC size while providing a fail-safe operation of a vehicle, the processing system includes safety island domain with less hardware than the main domain. In this regard, the safety island domain includes a processor for processing vehicle information and making similar calculations, such as determining the objects in the vehicle's periphery, as in the main domain. Since the safety island domain has less hardware than the main domain, those calculations are performed at a slower rate while maintaining a smaller area on the SoC. The safety island domain occasionally checkpoints its calculation with the calculations of the main domain. The safety island domain is configured to monitor errors originating in the main domain, the safety island domain, or both to determine the source of the error and perform an appropriate recovery mechanism. By monitoring errors generated by the main domain and the safety island, the safety island can advantageously recover from safety errors in either domain in the event of a fault or failure. For example, the safety island domain can reset itself when an error originates in the safety island domain.

In another exemplary aspect, when errors are received by the safety island domain in active mode, the safety island domain both electrically and logically isolates itself from the main domain and controls the operation of the vehicle during island mode. To minimize cost, SoC area, and save power, the safety island domain includes less hardware than the main domain and includes a processor which is configured to control the operation of the vehicle to the extent necessary to move the vehicle to a safe state as defined by ASIL-D requirements.

In another exemplary aspect, the safety island domain includes a processor and ensures a known boot process to advantageously avoid spurious signals at an interface between the main domain and the safety island domain by electrically and functionally isolating the safety island domain from the main domain during the boot process. Since during the boot process, the processor is booting, the safety island domain includes hardware to monitor and recover from errors generated from the safety island domain. The hardware advantageously provides a mechanism to reset the safety island domain during the boot process.

In this regard, in one aspect, a processor-based system for controlling operation of a vehicle is disclosed and comprises a main domain having a first processor. The first processor is configured to receive vehicle information from a vehicle network, process the vehicle information, and communicate over the vehicle network to instruct the vehicle how to operate. The processor-based system also includes a safety island domain comprising a second processor. The second processor is configured to receive the vehicle information from the vehicle network, process the vehicle information, checkpoint the vehicle information processed by the safety island domain with the vehicle information processed by the main domain, and monitor safety errors generated from the main domain and the safety island domain.

In another aspect, a method for controlling operation of a vehicle is disclosed. The method includes receiving, by a main domain, vehicle information from a vehicle network. The method also includes processing, by the main domain, the vehicle information. The method also includes communicating, by the main domain, over the vehicle network to instruct the vehicle how to operate. The method also includes receiving and processing, by a safety island domain, the vehicle information from the vehicle network. The method also includes checkpointing the vehicle information processed by the safety island domain with the vehicle information processed by the main domain. The method also includes monitoring safety errors, by the safety island domain, generated from the main domain and the safety island domain.

In another aspect, a processor-based system for controlling operation of a vehicle is disclosed. The processor-based system comprises a means for receiving, by a main domain, vehicle information from a vehicle network; a means for processing, by the main domain, the vehicle information; and a first means for communicating, by the main domain, over the vehicle network to instruct the vehicle how to operate. The processor-based system also comprises a means for receiving, by a safety island domain, the vehicle information from the vehicle network; a means for processing, by the safety island domain, the vehicle information from the vehicle network; a means for checkpointing the vehicle information processed by the safety island domain with the vehicle information processed by the main domain; and a means for monitoring safety errors, by the safety island domain, generated from the main domain and the safety island domain.

In another aspect, a non-transitory computer-readable storage medium is disclosed comprising instructions executable by a processor, which, when executed by the processor, causes the processor to control operation of a vehicle. The non-transitory computer-readable storage medium comprises receiving, by a main domain, vehicle information from a vehicle network, processing, by the main domain, the vehicle information, and communicating, by the main domain, over the vehicle network to instruct the vehicle how to operate. The non-transitory computer-readable storage medium further comprises receiving, by a safety island domain, the vehicle information from the vehicle network, processing, by the safety island domain, the vehicle information from the vehicle network, checkpointing the vehicle information processed by the safety island domain with the vehicle information processed by the main domain, and monitoring safety errors, by the safety island domain, generated from the main domain and the safety island domain.

BRIEF DESCRIPTION OF THE DRAWINGS

FIG. 5 is a table illustrating an exemplary set of errors monitored by the state detector of FIG. 1 along with a fault classification and system action taken by the safety island domain corresponding to the exemplary set of errors.

DETAILED DESCRIPTION

Figure 1:
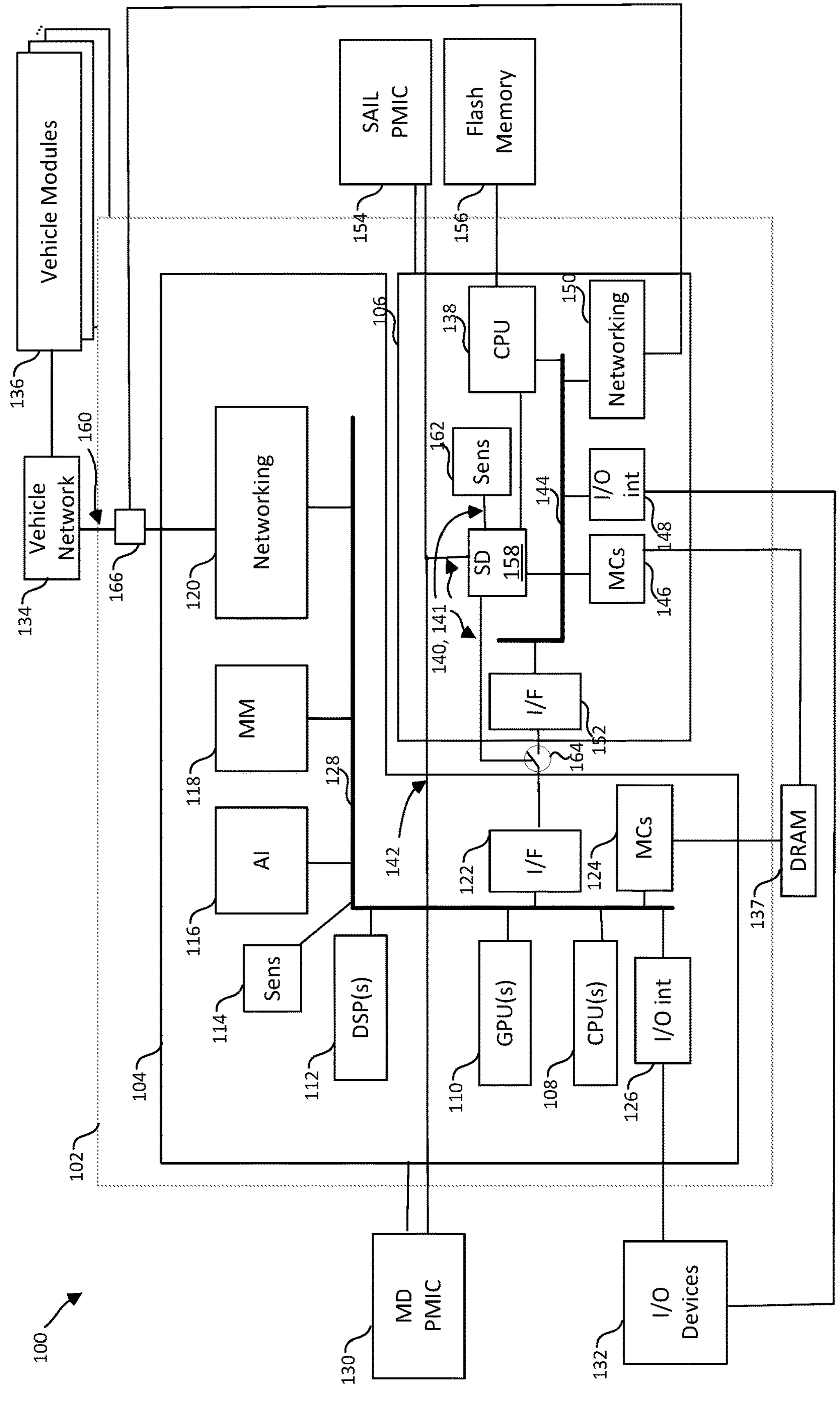
FIG. 1 is a block diagram of an exemplary processor-based system deployed as a SoC having a main domain and a safety island domain for fail-safe operation of a vehicle.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a processor-based system employing a safety island architecture for fail-safe operation. The processor-based system may be included in a system-on-a chip (SoC) that includes one or more processors and other processor related peripherals, including input/output (I/O) interfaces and memory.

In one aspect, the processor-based system includes a main domain for controlling a device, such as a vehicle. The main domain includes a first processor and other hardware circuits (e.g. graphics processing unit(s) (GPU), digital signal processor(s), artificial intelligence unit(s) (AI), multi-media unit(s) (MM)) used to monitor vehicle sensors on the vehicle such as cameras, speed sensors, location sensors and the like as well as domain sensors in the main domain including voltage sensors, temperature sensors, watch dog timers, aging sensors and the like. For example, the main domain utilizes GPU, DSP. AI, and MM units to achieve computer vision for recognizing the position and orientation of the vehicle and objects in the vehicle's periphery. The main domain communicates with vehicle modules including electromechanical modules to control operation of the vehicle. Such operation may include different autonomous driving use cases including autonomous cruise control, navigating the vehicle to certain destinations, autonomous parking and autonomous driving until summoned to avoid parking, and the like. Thus, it is important that these critical systems continue to operate in a fail-safe manner if the main domain were to incur a fault or failure. As such, the processing system includes safety island domain that includes a processor to make similar calculation as the main domain for recognizing the position of the vehicle and objects in the vehicle's periphery. But since the safety island domain does not have a GPU, DSP. MM, AI, the safety island domain calculates the same position and orientation of the vehicle and objects in the vehicle's periphery at a slower rate while consuming less area on the SoC than the main domain.

The safety island domain is configured to monitor errors originating in the main domain, the safety island domain, or both to determine the source of the error and an appropriate recovery mechanism. The safety island is also configured to communicate with the same external sensors and vehicle modules as the main domain. The main domain controls the operation of the vehicle during active mode while the safety island mode monitors errors that can be generated by both the main domain and the safety island domain. Active mode may be entered upon various actions including, but not limited to, engine startup, acceleration sensing, gear change, or entering a parking situation such as stopping after cruising, and sensing a parking environment such as a parking garage. In contrast, low power mode may be entered upon various states including, but not limited to, the vehicle stops running, ignition is turned off, and the car is parked. By monitoring errors generated by the main domain and the safety island domain, the safety island domain can advantageously recover from errors in either domain in the event of a fault or failure. For example, the safety island domain can reset itself when an error originates in the safety island domain.

In this regard, FIG. 1 is a block diagram of an exemplary processor-based system 100 deployed as a SoC 102 having a main domain (MD) 104 and a safety island domain 106 for fail-safe operation of a vehicle. A domain is an area on a SoC that contains various processing entities and circuits that are collectively powered by an individual power manager integrated circuit. Main domain 104 at least includes one or more central processing units (CPUs) 108, one or more graphic processing units (GPUs) 110, one or more digital signal processing units (DSPs) 112, sensors 114, an artificial intelligence (AI) engine 116, a multimedia (MM) engine 118, a networking circuit 120, an safety island domain interface 122 to the safety island domain 106, memory controllers 124, and input/output (I/O) interface 126 which are all coupled to each other through bus fabric 128. Main domain 104 is powered by the power manager integrated circuit (MD PMIC) 130. Sensors 114 include various sensors including, but not limited to, voltage sensor, amperage sensor, aging sensor, and temperature sensor.

I/O interface 126 also communicates with I/O devices 132 such as cameras and any other vehicle sensors external to SoC 102. Networking circuit 120 communicates over the vehicle network 134 to receive information from vehicle modules 136 and to instruct vehicle modules 136 which in turn control a vehicle's steering, throttling, and braking. Vehicle modules 136 may be electrical or electromechanical devices. Networking circuit 120 includes various communication interfaces including control area network flexible data-rate (CAN FD) interfaces for communicating data and control information. Memory controllers 124 communicate with dynamic random access memory (DRAM) 137. DRAM 137 includes data and programmable instructions to be generated and consumed by CPUs 108, GPUs 110, DSPs 112, MM engine 118 and AI engine 116. CPUs 108, GPUs 110, DSPs 112, MM engine 118 and AI engine 116 may include their own local memory system.

CPUs 108, GPUs 110, DSPs 112, and MM engine 118 are utilized to perform simultaneous tasks like camera vision, vehicle control, and information display. The AI engine 116 at least enables complex tasks in advanced driver-assistance systems (ADAS). GPUs 110, DSPs 1112, and MM engine 118 cooperate to determine the position and orientation of the vehicle and any objects in the vehicle's periphery.

Safety island domain 106 consumes less area than main domain 104 and includes a single CPU 138 to make similar computations as the main domain 104 but since it has less hardware than main domain 104, the computations made by CPU 138 is slower than the rate of computations made in the main domain 104. Safety island domain 106 also receives and processes information over vehicle network 134 and I/O devices 132 and DRAM 137 and instruct vehicle modules 136 to safely operate the vehicle in response to a safety error 140.

CPU 138 is coupled to bus fabric 144. The safety island domain 106 also includes memory controller 146 which is connected to bus fabric 144 and DRAM 137. I/O interface 148 which is connected to bus fabric 144 and I/O devices 132, networking circuit 150 which is connected to bus fabric 144 and communicates over vehicle network 134, and a main domain interface 152 coupled to the main domain and the bus fabric 144.

Safety island domain 106 is powered by SAIL PMIC 154 and retrieves data and instructions from flash memory 156 to boot CPUs. Safety island domain 106 also includes a state detector circuit 158 which monitors errors generated by the main domain 104, safety island domain 106 or both. State detector circuit 158 monitors and classifies safety errors and, depending on the error class type, recovers from a respective safety error 140. Details of state detector circuit 158 will be discussed in more detail in connection with FIG. 3. Classification types of safety errors will be discussed in more detail in connection with FIG. 5.

Safety errors 140 generated in main domain 104 may originate from sensors 114, I/O devices 132, main domain PMIC 130 or any of the components connected to bus fabric 128. Safety errors 140 generated in the main domain may be transmitted through safety island domain interface 122 and switch 164. State detector circuit 158 monitors safety errors generated in the main domain 104 through main domain interface 152 while switch 164 is connected. State detector circuit 158 also monitors and classifies safety errors originating in the safety island domain 106. Similarly, safety errors generated in the safety island domain 106 may originate from sensors 162, I/O devices 132, MD PMIC 130, SAIL PMIC 154 or any of the components connected to bus fabric 144. Sensors 162 include various sensors including, but not limited to, voltage sensors, amperage sensors, aging sensors, and temperature sensors.

A low power mode signal 141 may be generated by CPU 108 in main domain 104, MD PMIC 130, SAIL PMIC 154, or CPU 138 in the safety island domain 106. A low power mode signal 141 informs state detector circuit 158 to continue monitoring safety errors originating from both the main domain 104 and the safety island domain 106.

CPU 138 in the safety island domain 106 is configured to perform tasks similar to the main domain to control vehicle modules 136 in the vehicle but whose functionality is configured to the extent necessary to operate the vehicle to safety in case of a safety error 140 in the main domain at a slower speed than the main domain 104. For example, the safety island domain 106 will control the vehicle to safely park if a safety error 140 is detected by state detector circuit 158 when the vehicle is operating in adaptive cruise control, autonomous self driving or in manual driving modes. In another example, the safety island domain 106 is configured to not allow the vehicle to start or restart if a safety error 140 is detected by state detector circuit 158 in SoC 102 while the vehicle's ignition is turned on. In another example, the safety island domain 106 is configured to control the vehicle to switch-off and restart if any safety error 140 is detected by state detector circuit 158 when the vehicle is in parking mode. By contain less hardware circuitry than the main domain, the safety island domain 106 consumes less area of SoC 102 than main domain 104 and is still able to control the vehicle to safety.

When the main domain 104 is in active mode, the main domain 104 receives vehicle information 160 from vehicle network 134. See block 202 in FIG. 2. Main domain 104 processes the received vehicle information 160. See block 204 in FIG. 2. Also, main domain 104 monitors I/O devices 132, monitors its own sensors 114, transmits safety errors 140 through safety island domain interface 122 over closed switch 164 to safety island domain 106. Main domain 104 communicates over vehicle network 134 to instruct vehicle modules how to operate. See block 206 in FIG. 2. While the main domain 104 is in active mode, safety island domain 106 receives and processes the same data (also known as vehicle information) received by main domain 104 over vehicle network 134, I/O devices 132, and DRAM 137 to be able to switch the flow of instructions to vehicle network 134 from the main domain 104 to the safety island domain 106 in case of a fatal fault in main domain 104. See blocks 208 and 210 in FIG. 2.

Also, during active mode, the main domain 104, at points in time, sends processed vehicle information such as objects in the vehicle's periphery to the safety island domain 106 through safety island domain interface 122. At these points in time, the safety island domain 106 checks to see if it is processing the vehicle information similarly as main domain 104 but with different hardware than the main domain 104. The safety island domain 106 receives the processed vehicle information through main domain interface 152 and compares it with its processed vehicle information such as the objects in the vehicle's periphery at the same time reference point. These occasional checkpoints allow the safety island domain 106 to ensure that it is in position to take over operation of the vehicle in case a safety error is generated that requires the safety island domain 106 to take control. The discussion in connection with FIG. 4 will address particular safety errors that will cause the safety island domain 106 to take control of the vehicle. See block 212 in FIG. 2.

State detector circuit 158 also monitors safety errors 140 through main domain interface 152 over bus fabric 144, safety errors generated by sensors 162 in the safety island domain 106 and safety errors generated from I/O devices 132 through I/O interface 148, and safety errors generated by DRAM 137 through memory controller 146. See block 214 in FIG. 2. Arbiter 166 controls whether to flow instructions to the vehicle modules from main domain 104 or safety island domain 106. In active mode, arbiter 166 will allow only instructions from main domain 104 to pass through vehicle network 134. Although arbiter 166 is shown as a stand alone block in FIG. 1, arbiter 166 may be alternatively incorporated in vehicle network 134.

In response to receiving a safety error 140 by state detector circuit 158, state detector circuit 158 will enter island mode. Island mode is entered by the safety island domain 106 electrically and functionally isolating itself from main domain 104. State detector circuit 158 disconnects switch 164 to electrically isolate the safety island domain 106 from the main domain 104. Additionally, state detector circuit 158 also functionally isolates safety island domain 106 from main domain 104 by causing safety island domain 106 to signal arbiter 166 to stop allowing instructions to flow from main domain 104 to vehicle network 134 and to allow instructions to flow from safety island domain 106 to vehicle network 134. State detector circuit 158 aggregates many different safety errors 140 so that a single enable isolation signal is generated by state detector circuit 158 to simultaneously electrically and functionally isolate safety island domain 106 from main domain 104. In this way, time delay caused by sequentially isolating main domain 104 from the safety island domain 106 can be avoided. State detector circuit 158 classifies a received safety error 140 and, depending on the classification, determines a recovery for the respective safety error. Classification types and recoveries are discussed further in connection with FIG. 5. Besides triggering operation of the vehicle to be controlled by safety island domain 106, state detector circuit 158 may signal MD PMIC 130 to reset the main domain 104, may signal SAIL PMIC 154 to reset the safety island domain, or signal both MD PMIC 130 and SAIL PMIC 154 to reset SoC 102.

When SoC 102 is initially powered on, also known as cold boot, processor-based system 100 employing a safety island architecture for fail-safe operation provides the processor-based system to be booted in a known state. When a system reset signal is received by state detector circuit 158 from SAIL PMIC 154, state detector circuit 158 electrically isolates from main domain by opening switch 164 and awaits a boot complete signal from MD PMIC 130 to remove isolation from main domain 104. Switch 164 provides a path for monitoring safety errors 140 as well as accomplishing data processing activities between main domain 104 and safety island domain 106. For example, main domain 104 may transmit processed data to safety island domain 106 which, in turn, the safety island domain 106 communicates to the vehicle modules 136.

During cold boot, instructions from flash memory 156 are loaded in CPU 138 to initiate the boot sequence of CPU 138. During cold boot, state detector circuit 158 monitors safety errors 140 from sensors 162 so it can re-boot itself if needed. When a boot complete signal 142 is received by state detector circuit 158 from main domain PMIC 130, state detector circuit 158 closes switch 164 in order to begin monitoring safety errors 140 originating from the main domain 104. Being able to electrically isolate the main domain from the safety island domain 106 advantageously ensures that both the main domain 104 and safety island domain 106 are booted to a known state.

When the vehicle is parked and the ignition is off, both the main domain 104 and the safety island domain 106 operate in a low power state. In the low power state, vehicle modules 136 transmit less information than when the vehicle is in active state. As such, processing by the main domain 104 and the safety island domain 106 is reduced such that minimal instructions are being processed over a period of time to save power. State detector circuit 158 continues to monitor safety errors 140 originating in main domain 104, safety island domain 106, DRAM 137, and I/O devices 132.

Figure 3:
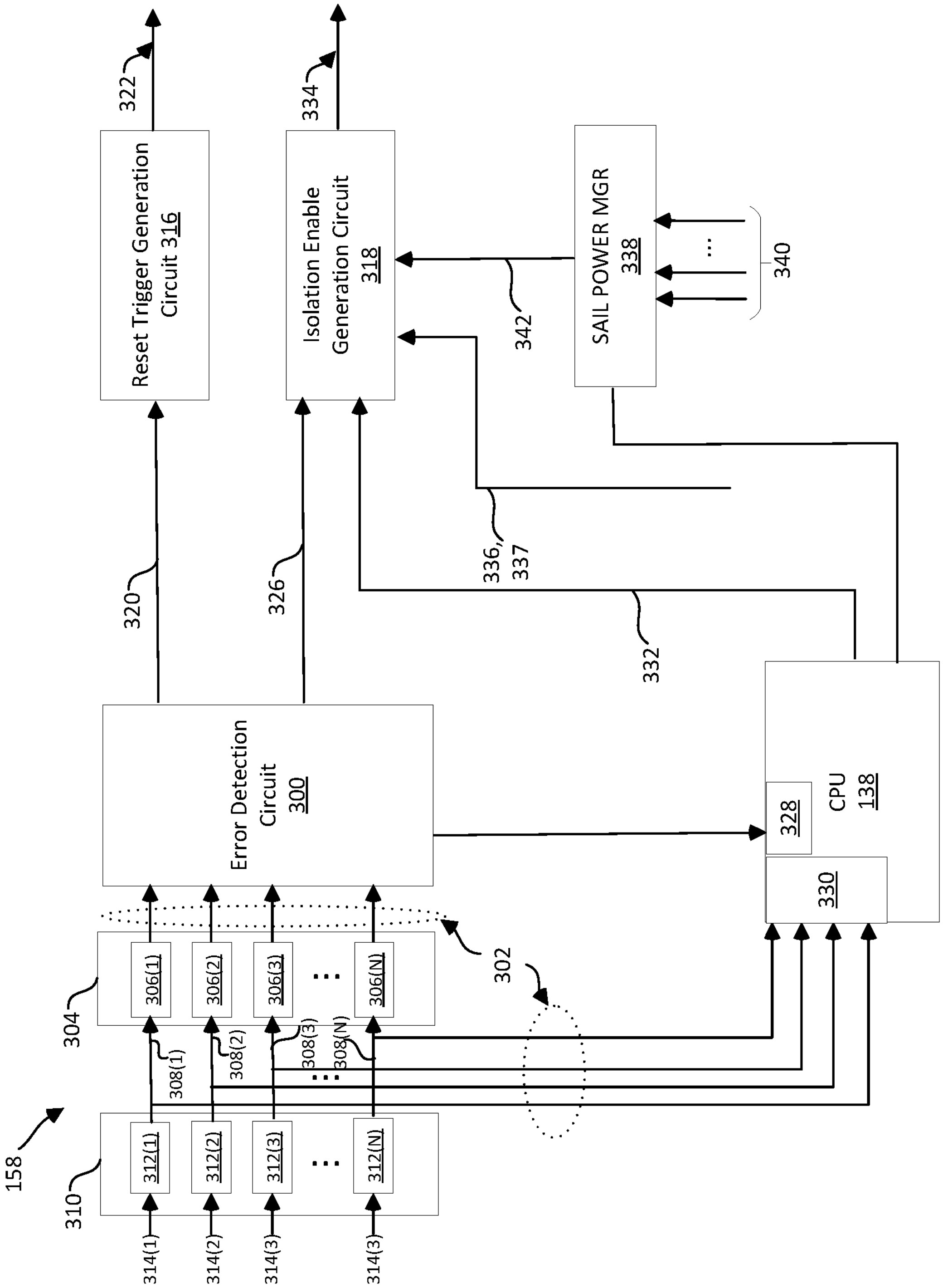
FIG. 3 is a block diagram of an exemplary state detector circuit in the safety island domain shown in FIG. 1.

FIG. 3 is a block diagram of an exemplary state detector circuit 158 in the safety island domain shown in FIG. 1. State detector circuit 158 is powered by SAIL PMIC 154. State detector circuit 158 includes an error detection circuit 300 which receives safety errors 302 from configurable filter circuits 304. State detector circuit 158 is preferably deployed as hardware so as not to require instructions to monitor and classify safety errors during boot up. Configurable filter circuits 304 include individual filter circuits 306(1)-306(N). Each individual filter circuit 306(1)-306(N) correspond to a specific safety error and may be individually configured to allow or restrict the specific safety error to be detected by error detection circuit 300 or by CPU 138. In one implementation, each individual filter circuit 306(1)-306(N) may have a corresponding register that can be set to allow or restrict the corresponding safety error to be detected by error detection circuit 300. Configurable filter circuits 304 receive a subset of safety errors 308(1)-308(N) from glitch filters 310. The subset of safety errors 308(1)-308(N) include latency critical errors such as thermal, PMIC errors, and the like. Glitch filters 310 includes individual glitch filter circuits 312(1)-312(N). Each individual glitch filter circuit 312(1)-312(N) is configured to define a tolerance level of safety error signals 314(1)-314(N). For example, a safety error signal 314(1) may be enabled for a configurable period before the safety error signal 314(1) should be considered a safety error 308(1). Glitch filter circuits 312 (1)-312(N) may also be configured to disable design for test (DFT) safety error signals and debug safety error signals.

State detector circuit 158 also includes a reset trigger generation circuit 316, and an isolation enable generation circuit 318. Error detection circuit 300 detects and classifies safety errors 302 or, in other words, aggregates all safety errors in the same class. Depending on the classification of a safety error 302, error detection circuit 300 signals the reset trigger generation circuit 316 over path 320 to either reset the main domain 104, reset the safety island domain 106, reset both the main domain 104 and the safety island domain 106, or takes corrective action without signaling the reset trigger generation circuit 316. Reset trigger generation circuit 316 may send a reset signal 322 to main domain PMIC 130 and may send a reset signal 322 to SAIL PMIC 154. Depending on the classification of a safety error 302, error detection circuit 300 may signal isolation enable generation circuit 318 over path 326 to enable or disable electrical and functional isolation of main domain 104. If the classification of a safety error 302 requires safety action to be performed by safety island domain 106 on a vehicle, error detection circuit 300 issues an interrupt to CPU 138. CPU 138 is configured to have preconfigured interrupt handlers 328 to execute instructions on CPU 138 to communicate with other circuits and engines coupled to bus fabric 144 to safely operate the vehicle depending on the specific interrupt generated by error detection circuit 300.

CPU 138 also includes interrupt handlers 330 which receive interrupts generated by a subset of glitch filter circuits 312(1)-312(N). The subset of glitch filter circuits 312(1)-312(N) which trigger interrupt handlers 330 correspond to non-latency critical and recoverable safety errors. With this subset of glitch filter circuits 312(1)-312(N), interrupt handlers 330, not error detection circuit 300, classify the safety errors. Depending on the classification of these safety errors 302, the CPU 138 may signal isolation enable generation circuit 318 over path 332 to enable or disable electrical and functional isolation of main domain 104 and communicate with other circuits and engines coupled to bus fabric 144 to safely operate the vehicle such as performing the necessary ASIL-D safety operations on the vehicle.

Isolation enable generation circuit 318 generates a single enable/disable isolation signal 334 to simultaneously disconnect/connect switch 164 and signal arbiter 166 to allow/disallow instructions over vehicle network 134 from the safety island domain. By default, isolation enable generation circuit 318 generates an enable isolation signal so that safety island domain 106 can boot independently from main domain 104. Once the main domain 104 is properly booted, a boot complete signal 336 is received by isolation enable generation circuit 318 which, in turn, generates a disable isolation signal 334.

State detector circuit 158 also includes a safety island (SAIL) power manager circuit 338. SAIL power manager circuit 338 may put the safety island domain in low power mode to save power. While in low power mode, SAIL power manager circuit 338 continues to monitor the health of the MD PMIC 130 and SAIL PMIC 154 through external general purpose input/output (GPIO) interrupts 340. In case of monitoring MD PMIC 130 and SAIL PMIC 154, SAIL power manager circuit 338 may signal isolation enable generation circuit 318 over path 342 to enable or disable main domain 104 isolation.

Figure 4:
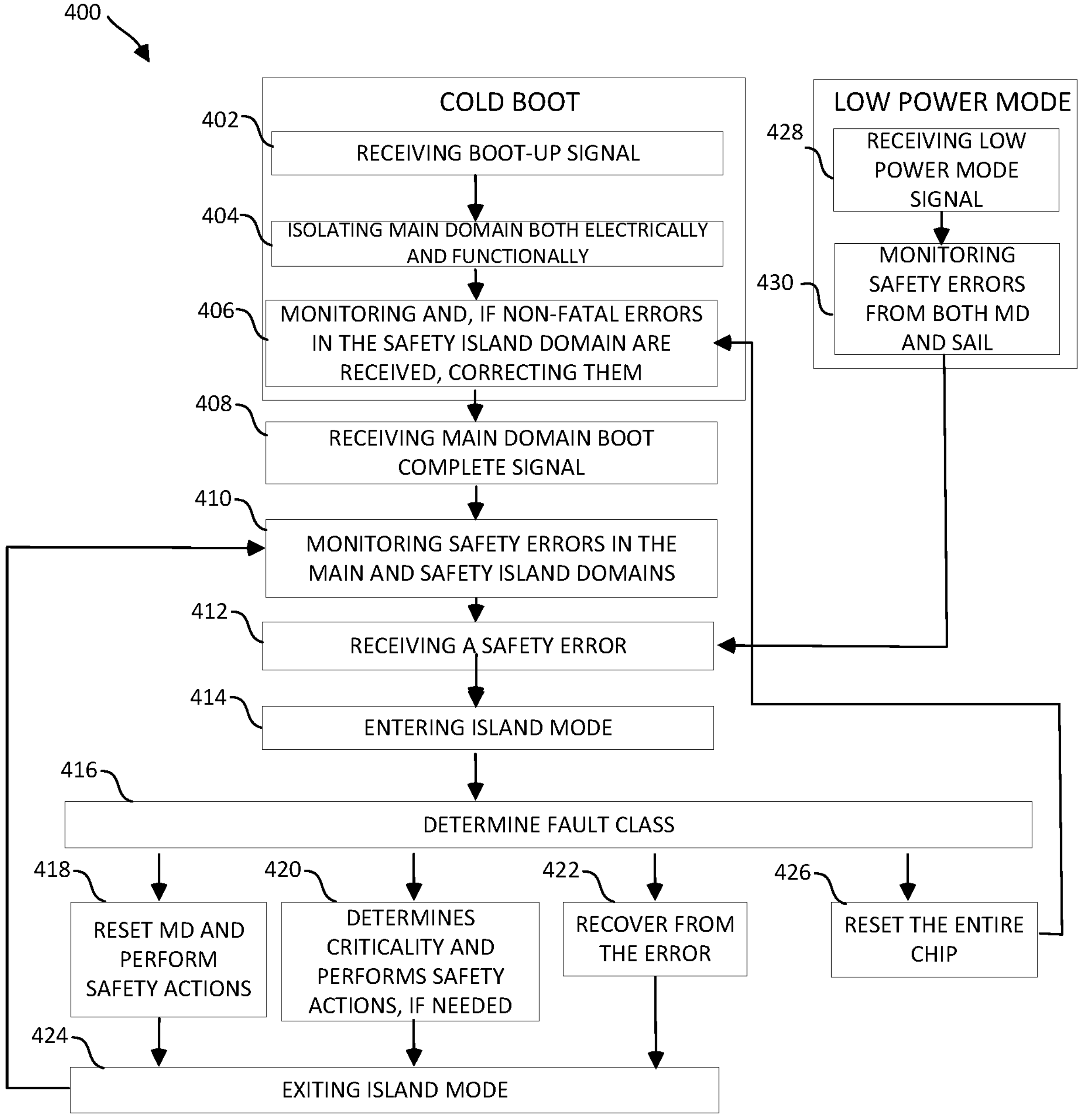
FIG. 4 is a flow chart illustrating an exemplary process of a safety island domain in the processor-based system of FIG. 1 for fail-safe operation of a vehicle.

FIG. 4 is a flow chart illustrating an exemplary process 400 of a safety island domain in the processor-based system of FIG. 1 for fail-safe operation of a vehicle. During cold boot of SoC 102, safety island domain 106 performs operations at blocks 402, 404, and 406. At block 402, safety island domain receives a boot-up signal 337. At block 404, safety island domain 106 isolates main domain 104 both electrically and functionally as described in connection with FIG. 1 above. At block 406, safety island domain 106 monitors and, if non-fatal errors are received during boot-up, corrects the non-fatal errors. Safety island domain 106 continues to monitor errors until it receives a boot complete signal at block 408 indicating that the main domain has successfully completed booting up and transitions to block 410. At block 410, safety island domain 106 monitors safety errors originating in the main domain 104 and the safety island domain 106.

At block 412, safety island domain 106 receives a safety error. As discussed in connection with FIG. 3, the safety error is preconfigured to be received either through an interrupt at interrupt handler 330 and processed by CPU 138 (non-latency critical errors) or through a signal at error detection circuit 300 (latency critical errors). At block 414, safety island domain 106 enters island mode by both electrically and functionally isolating main domain 104 as described in connection with FIG. 3. At block 416, safety island domain 106 determines the fault class of the received safety error. If the fault class is a fatal fault in the main domain 104, safety island domain 106 proceeds to block 418 to reset main domain 104 and perform safety actions on the vehicle. Once complete, safety island domain 106 proceeds to block 424 to exit island mode. If the fault class is a non-fatal fault in the main domain 104, safety island domain 106 proceeds to block 420 to determine the criticality of the non-fatal fault and perform safety actions on the vehicle depending on the determined criticality of the non-fatal fault. Once complete, safety island domain 106 proceeds to block 424 to exit island mode. If the fault class is a non-fatal fault in the safety island domain 106, the safety island domain 106 proceeds to block 422 and recovers from the safety error. Once complete, safety island domain 106 proceeds to block 424 to exit island mode. At block 424, safety island domain 106 exits island mode by disabling electrical and functional isolation of main domain 104 and transitioning operation of the vehicle to main domain 104 and proceeds to block 410. At block 410, safety island domain 106 monitors safety errors in the main and safety island domains.

If the fault class is a fatal fault in the safety island domain 106, the safety island domain 106 proceeds to block 426 and resets the entire SoC 102 by sending a reset signal 322 to main domain PMIC 130 and sending a reset signal 322 to SAIL PMIC 154. During the reset of the entire chip, safety island domain 106 proceeds to block 406 where it continues to monitor safety errors originating in the safety island domain during the SoC reset.

As described in connection with FIG. 1, a vehicle may cause SoC 102 to be in low power mode. At block 428, safety island domain 106 receives a low power mode signal 141 to transition itself into low power mode. Low power mode in the safety island domain 106 includes various approaches including, but not limited to, slowing clock frequencies which drive CPU 138, for example, and lowering voltage rails which drive CPU 138, for example. While safety island domain 106 is operating in low power mode, state detector circuit 158, at block 430, continues to monitor safety errors which may originate in both main domain 104 and safety island domain 106. Depending on the low power approaches deployed in the safety island domain 106, the detection of safety errors will be either by the error detection circuit 300 or the CPU 138. For example, if the CPU 138 utilizes a clock gating approach in low power mode, all safety errors will be detected in error detection circuit 300. Block 430 proceeds to block 412 when a safety error is received.

FIG. 5 is a table 500 illustrating an exemplary set of errors monitored by the state detector circuit 158 of FIG. 1 along with a fault classification and system action taken by the safety island domain corresponding to the exemplary set of errors. Error description 502 lists the error description of the set of exemplary safety errors. In general, safety errors are related to transient faults which can perturb the intended operation of a vehicle such as temperature going out of safe limit, uncorrectable error in memory, and the like. Fault class 504 lists the various fault classes associated with the respective safety error. Safety island actions 506 lists the various actions taken by safety island domain 106 corresponding to the respective safety error. Exemplary main domain non-fatal fault 508, main domain fatal fault 510, safety island domain fatal fault 512, and safety island domain non-fatal fault 514 are shown in table 500.

Figure 2:
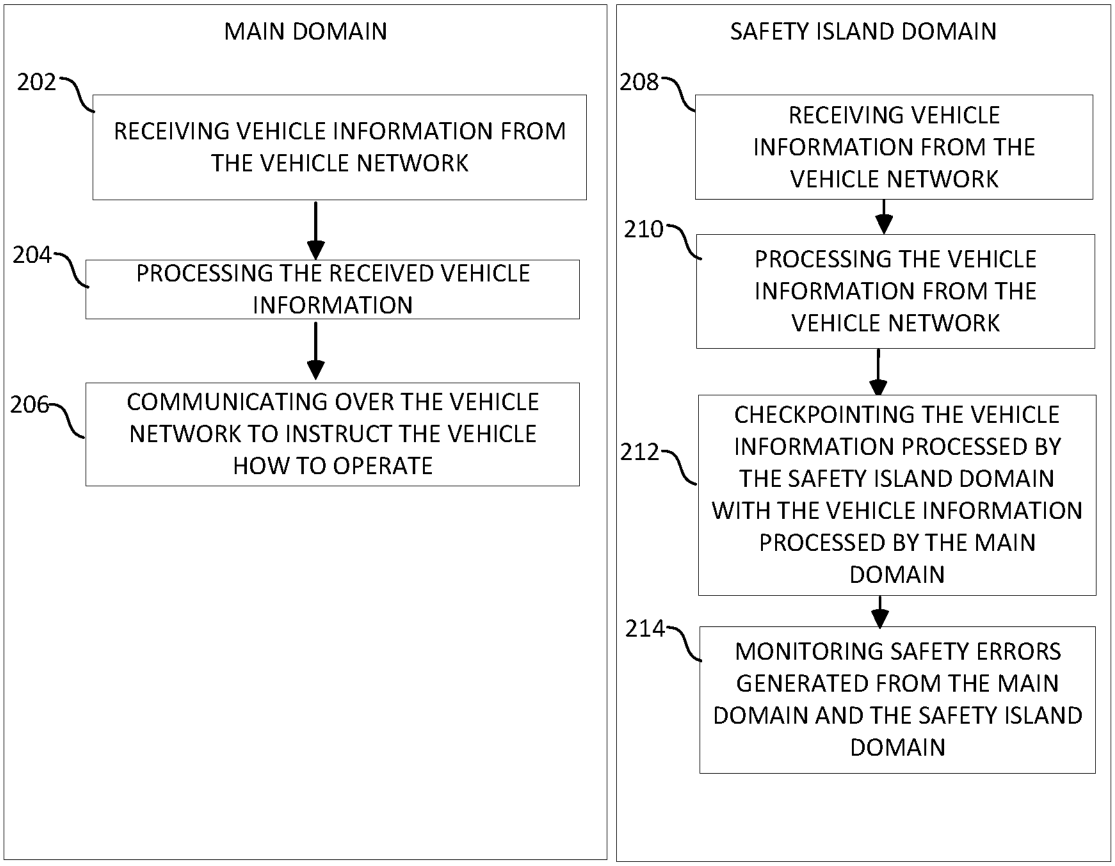
FIG. 2 is a flow chart illustrating an exemplary process of a main domain and a safety island domain in the processor-based system of FIG. 1 for fail-safe operation of a vehicle.

Electronic devices that include an exemplary processor-based system deployed as a SoC having a main domain and a safety island domain for fail-safe operation of a vehicle as described in FIGS. 1-3, and according to any aspects disclosed herein, may be provided in or integrated into any processor-based device. Examples, without limitation, include an automobile, a vehicle component, an avionics system, a drone, and a multicopter.

Figure 6:
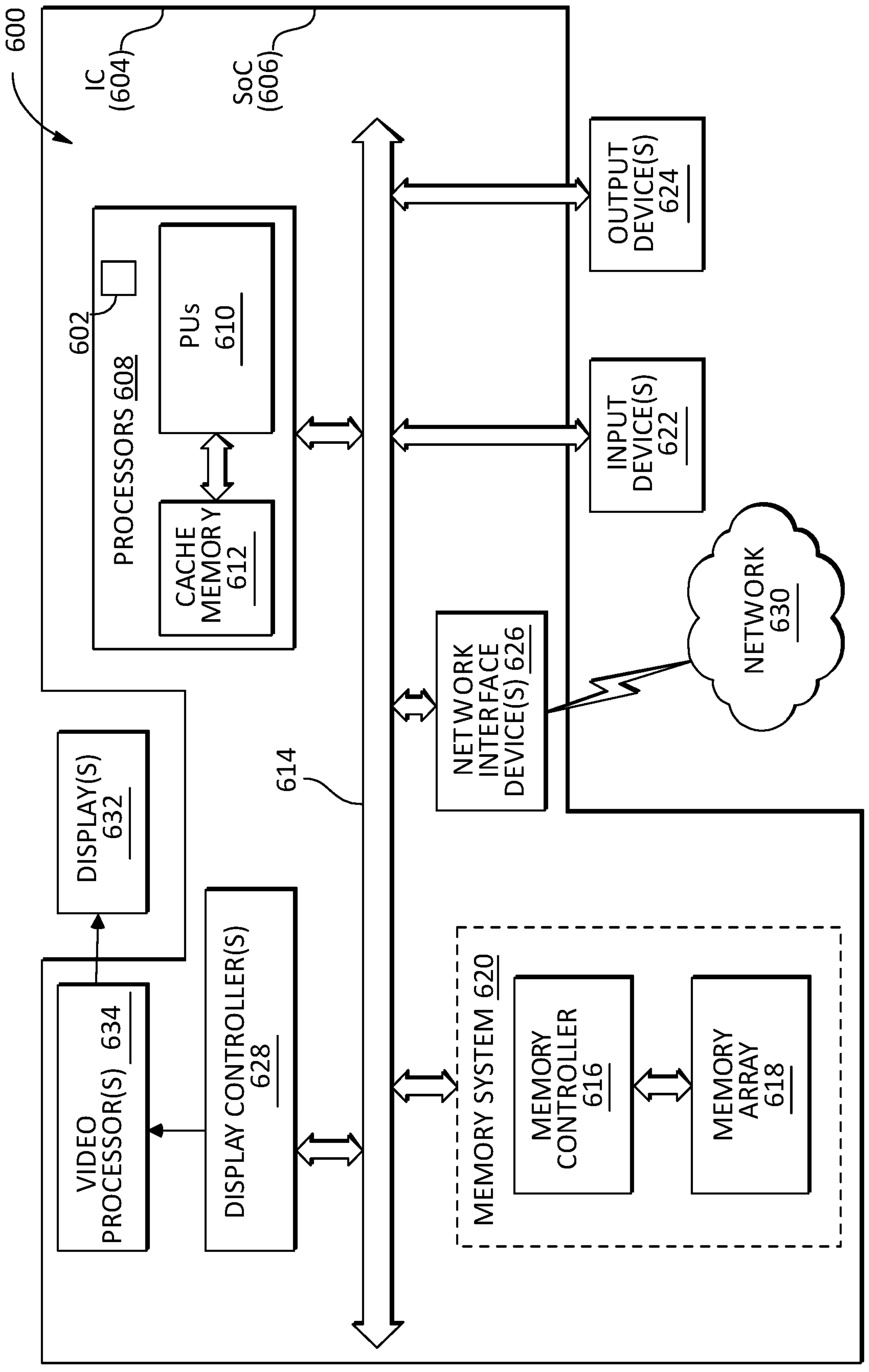
FIG. 6 is a block diagram of an exemplary processor-based system that can include an exemplary SoC having a main domain and a safety island domain as shown in FIG. 1 and to monitor errors generated by the main domain, safety island domain or both.

In this regard, FIG. 6 illustrates an example of a processor-based system 100 that can include an exemplary processor-based system deployed as a SoC having a main domain and a safety island domain for fail-safe operation of a vehicle as described in FIGS. 1-3, and according to any exemplary aspects disclosed herein. In this example, the processor-based system 600 may be formed as an IC 604 in an SoC 606 having a main domain and a safety island domain for fail-safe operation of a vehicle. The safety island domain including a state detector 602 for monitoring safety errors in both the main domain and safety island domain as described in FIGS. 1-3. The processor-based system 600 includes a processor 608 that includes one or more processing units (PU) 610 including, but not limited to, one or more CPUs, DSPs, and GPUs partitioned into a main domain and safety island domain (not shown). PU 610 may have cache memory 612 coupled to the PU 610 for rapid access to temporarily stored data. The PU 610 is coupled to a system bus 614 and can intercouple master and slave devices included in the processor-based system 600. As is well known, the PU 610 communicates with these other devices by exchanging address, control, and data information over the system bus 614. For example, the PU 610 can communicate bus transaction requests to a memory controller 616, as an example of a slave device. Although not illustrated in FIG. 6, multiple system buses 614 could be provided, wherein each system bus 614 constitutes a different fabric in a different domain as shown in FIG. 1.

Other master and slave devices can be connected to the system bus 614. As illustrated in FIG. 6, these devices can include a memory system 620 that includes the memory controller 616 and a memory array(s) 618, one or more input devices 622, one or more output devices 624, one or more network interface devices 626, and one or more display controllers 628, as examples. Each of the memory system(s) 620, the one or more input devices 622, the one or more output devices 624, the one or more network interface devices 626, and the one or more display controllers 628 can be provided in the same or different electronic devices. The input device(s) 622 can include any type of input device, including, but not limited to, input keys, switches, voice processors, etc. The output device(s) 624 can include any type of output device, including, but not limited to, audio, video, other visual indicators, etc. The network interface device(s) 626 can be any device configured to allow exchange of data to and from a network 630 to control a vehicle. The network 630 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 626 can be configured to support any type of communications protocol desired.

The PU 610 may also be configured to access the display controller(s) 628 over the system bus 614 to control information sent to one or more displays 632. The display controller(s) 628 sends information to the display(s) 632 to be displayed via one or more video processor(s) 634, which process the information to be displayed into a format suitable for the display(s) 632. The display controller(s) 628 and video processor(s) 634 can be included as ICs in the same or different electronic devices, and in the same or different electronic devices containing the processors 608, as an example. The display(s) 632 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based system for controlling operation of a vehicle comprising:
   a main domain comprising a first processor configured to:
      receive vehicle information from a vehicle network;
      process the vehicle information; and
      communicate over the vehicle network to instruct the vehicle how to operate; and
   a safety island domain comprising a second processor configured to:
      receive the vehicle information from the vehicle network;
      process the vehicle information;
      checkpoint the vehicle information processed by the safety island domain with the vehicle information processed by the main domain; and
      monitor safety errors generated from the main domain and the safety island domain.
2. The processor-based system of clause 1, wherein, in response to a safety error, the safety island domain is configured to:
   enter an island mode by electrically and functionally isolating the safety island domain from the main domain, and
   instruct the vehicle how to operate through the vehicle network and to monitor safety errors generated by both the main domain and the safety island domain.
3. The processor-based system of clause 2, wherein the safety island domain is further configured to enter the island mode by being configured to:
   generate a single enable isolation signal to simultaneously electrically and functionally isolate the safety island domain from the main domain.
4. The processor-based system of clauses 1-3, wherein, in response to a safety error, the safety island domain is further configured to:
   classify the first safety error into a fault class.
5. The processor-based system of clause 4, wherein, in response to the safety error being classified as a main domain fatal fault, the safety island domain is configured to:
   reset the main domain and instruct, through the vehicle network, safety actions to perform on the vehicle.
6. The processor-based system of clause 4, wherein, in response to the safety error being classified as a main domain non-fatal fault, the safety island domain is configured to:
   determine a criticality of the main domain non-fatal fault; and
   instruct, through the vehicle network, safety actions to perform on the vehicle based on the criticality of the main domain non-fatal fault.
7. The processor-based system of clause 4, wherein, in response to the safety error being classified as a safety island domain non-fatal fault, the safety island domain is configured to:
   recover from the safety island domain non-fatal fault while the main domain continues to control operation of the vehicle.
8. The processor-based system of clause 4, wherein, in response to the safety error being classified as a safety island domain fatal fault, the safety island domain is configured to:
   reset both the main domain and the safety island domain.
9. The processor-based system of clauses 1-8, wherein the safety island domain further comprises:
   glitch filters configured to enable and disable safety error signals and adjust tolerance levels for the safety error signals when generating a corresponding safety error.
10. The processor-based system of clause 9, wherein the safety island domain further comprises:
   hardware filters configured to enable and disable corresponding safety errors.
11. The processor-based system of clauses 1-10, wherein the second processor is further configured to receive a low power mode signal, and the second processor, in response to the low power mode signal, is configured to:
   continue monitoring safety errors generated from both the main domain and the safety island domain.
12. The processor-based system of clauses 1-11, wherein the second processor is further configured to receive a boot-up signal,
   wherein, in response to the boot-up signal, the safety island domain is configured to:
      electrically and functionally isolate the safety island domain from the main domain; and
      monitor and recover from non-fatal errors in the safety island domain.
13. A method for controlling operation of a vehicle comprising:
   receiving, by a main domain, vehicle information from a vehicle network;
   processing, by the main domain, the vehicle information;
   communicating, by the main domain, over the vehicle network to instruct the vehicle how to operate;
   receiving, by a safety island domain, the vehicle information from the vehicle network;
   processing, by the safety island domain, the vehicle information;

checkpointing the vehicle information processed by the safety island domain with the vehicle information processed by the main domain; and monitoring safety errors, by the safety island domain, generated from the main domain and the safety island domain.

14. The method of clause 13, wherein, in response to a safety error, the method further comprises:

entering an island mode, by the safety island domain, by electrically and functionally isolating the safety island domain from the main domain; and instructing, by the safety island domain, the vehicle how to operate through the vehicle network and to monitor safety errors generated by both the main domain and the safety island domain.

15. The method of clause 14, wherein entering the island mode further comprises:

generating a single enable isolation signal to simultaneously electrically and functionally isolate the safety island domain from the main domain.

16. The method of clauses 13-15, wherein, in response to a safety error, the method further comprises:

classifying the safety error into a fault class.

17. The method of clause 16, wherein, in response to the safety error being classified as a main domain fatal fault, the method further comprises:

resetting the main domain; and instructing, through the vehicle network, safety actions to perform on the vehicle.

18. The method of clause 16, wherein, in response to the safety error being classified as a main domain non-fatal fault, the method further comprises:

determining a criticality of the main domain non-fatal fault; and instructing, through the vehicle network, safety actions to perform on the vehicle based on the criticality of the main domain non-fatal fault.

19. The method of clause 16, wherein, in response to the safety error being classified as a safety island domain non-fatal fault, the method further comprises:

recovering from the safety island domain non-fatal fault while the main domain continues to control operation of the vehicle.

20. The method of clause 16, wherein, in response to the safety error being classified as a safety island domain fatal fault, the method further comprises:

resetting both the main domain and the safety island domain.

21. The method of clauses 13-20, further comprising:

receiving a low power mode signal; and continuing to monitor safety errors generated from both the main domain and the safety island domain.

22 The method of clauses 13-20, further comprising:

receiving a boot-up signal;

electrically and functionally isolating the safety island domain from the main domain; and monitoring and recovering from non-fatal errors in the safety island domain.

23. A processor-based system for controlling operation of a vehicle comprising:

means for receiving, by a main domain, vehicle information from a vehicle network;

means for processing, by the main domain, the vehicle information;

a first means for communicating, by the main domain, over the vehicle network to instruct the vehicle how to operate;

means for receiving, by a safety island domain, the vehicle information from the vehicle network;

means for processing, by the safety island domain, the vehicle information from the vehicle network;

means for checkpointing the vehicle information processed by the safety island domain with the vehicle information processed by the main domain; and means for monitoring safety errors, by the safety island domain, generated from the main domain and the safety island domain.

24. The processor-based system of clause 23, wherein, in response to a safety error, the processor-based system further comprises:

means for entering an island mode, by the safety island domain, by electrically and functionally isolating the main domain, and means for instructing, by the safety island domain, the vehicle how to operate through the vehicle network and to monitor safety errors generated by both the main domain and the safety island domain.

25. The processor-based system of clause 24, wherein the means for entering the island mode further comprises:

means for generating a single enable isolation signal to simultaneously electrically and functionally isolate the safety island domain from the main domain.

26. The processor-based system of clauses 23-25, wherein, in response to a safety error, the processor-based system further comprises:

means for classifying the safety error into a fault class.

27. The processor-based system of clause 26, wherein in response to the safety error being classified as a main domain fatal fault, the processor-based system further comprises:

means for resetting the main domain; and wherein the means for instructing further comprises instructing, through the vehicle network, safety actions to perform on the vehicle.

28. The processor-based system of clause 26, wherein in response to the safety error being classified as a main domain non-fatal fault, the processor-based system further comprises:

means for determining a criticality of the main domain non-fatal fault; and wherein the means for instructing further comprises instructing, through the vehicle network, safety actions to perform on the vehicle based on the criticality of the main domain non-fatal fault.

29. The processor-based system of clause 26, wherein in response to the safety error being classified as a safety island domain non-fatal fault, the processor-based system further comprises:

means for recovering from the safety island domain non-fatal fault while the main domain continues to control operation of the vehicle.

30. The processor-based system of clause 26, wherein in response to the safety error being classified as a safety island domain fatal fault, the processor-based system further comprises:

means for resetting both the main domain and the safety island domain.

31. A non-transitory computer-readable storage medium comprising instructions executable by a processor, which, when executed by the processor, causes the processor to control operation of a vehicle, comprising:

receiving, by a main domain, vehicle information from a vehicle network;

processing, by the main domain, the vehicle information;

communicating, by the main domain, over the vehicle network to instruct the vehicle how to operate;

receiving, by a safety island domain, the vehicle information from the vehicle network;

processing, by the safety island domain, the vehicle information from the vehicle network;

checkpointing the vehicle information processed by the safety island domain with the vehicle information processed by the main domain; and monitoring safety errors, by the safety island domain, generated from the main domain and the safety island domain.

32. The non-transitory computer-readable storage medium of clause 31, wherein, in response to a safety error, the non-transitory computer-readable storage medium further comprises:

entering an island mode, by the safety island domain, by electrically and functionally isolating the safety island domain from the main domain, and instructing, by the safety island domain, the vehicle how to operate through the vehicle network and to monitor safety errors generated by both the main domain and the safety island domain.

33. The non-transitory computer-readable storage medium of clause 32, wherein entering the island mode further comprises:

generating a single enable isolation signal to simultaneously electrically and functionally isolate the safety island domain from the main domain.

34. The non-transitory computer-readable storage medium of clauses 31-33, wherein, in response to a safety error, the non-transitory computer-readable storage medium further comprises:

classifying the safety error into a fault class.

35. The non-transitory computer-readable storage medium of clause 34, wherein, in response to the safety error being classified as a main domain fatal fault, the non-transitory computer-readable storage medium further comprises:

resetting the main domain; and instructing, through the vehicle network, safety actions to perform on the vehicle.

36. The non-transitory computer-readable storage medium of clause 34, wherein, in response to the safety error being classified as a main domain non-fatal fault, the non-transitory computer-readable storage medium further comprises:

determining a criticality of the main domain non-fatal fault; and instructing, through the vehicle network, safety actions to perform on the vehicle based on the criticality of the main domain non-fatal fault.

37. The non-transitory computer-readable storage medium of clause 34, wherein, in response to the safety error being classified as a safety island domain non-fatal fault, the non-transitory computer-readable storage medium further comprises:

recovering from the safety island domain non-fatal fault while the main domain continues to control operation of the vehicle.

38. The non-transitory computer-readable storage medium of clause 34, wherein, in response to the safety error being classified as a safety island domain fatal fault, the non-transitory computer-readable storage medium further comprises:

resetting both the main domain and the safety island domain.

What is claimed is:

1. A processor-based system deployed as a system on chip (SoC) for controlling operation of a vehicle comprising:

a main domain consuming a first area on the SoC, comprising a first processor configured to:

receive vehicle information from a vehicle network;

process the vehicle information; and communicate over the vehicle network to instruct the vehicle how to operate; and a safety island domain consuming a second area on the SoC, the second area is less than the first area, the safety island domain comprising a second processor configured to:

independently receive the vehicle information from the vehicle network;

independently process the vehicle information in parallel with the main domain;

perform a checkpoint operation that compares results of processing performed by the safety island domain with results of processing performed by the main domain for a same processing interval to detect a safety fault; and monitor safety errors generated by both the main domain and the safety island domain, wherein the monitoring is performed by circuitry residing within the safety island domain.

2. The processor-based system of claim 1, wherein, in response to a safety error, the safety island domain is configured to:

enter an island mode by electrically and functionally isolating the safety island domain from the main domain; and instruct the vehicle how to operate through the vehicle network and to monitor safety errors generated by both the main domain and the safety island domain.

3. The processor-based system of claim 2, wherein the safety island domain is further configured to enter the island mode by being configured to:

generate a single enable isolation signal to simultaneously electrically and functionally isolate the safety island domain from the main domain.

4. The processor-based system of claim 2, wherein the safety island domain further comprises:

glitch filters configured to enable and disable safety error signals and adjust tolerance levels for the safety error signals when generating a corresponding safety error.

5. The processor-based system of claim 4, wherein the safety island domain further comprises:

hardware filters configured to enable and disable corresponding safety errors.

6. The processor-based system of claim 1, wherein, in response to a safety error, the safety island domain is further configured to:

classify the safety error into a fault class.

7. The processor-based system of claim 6, wherein, in response to the safety error being classified as a safety island domain non-fatal fault, the safety island domain is configured to:

recover from the safety island domain non-fatal fault while the main domain continues to control operation of the vehicle.

8. The processor-based system of claim 6, wherein, in response to the safety error being classified as a safety island domain fatal fault, the safety island domain is configured to:

reset both the main domain and the safety island domain.

9. The processor-based system of claim 6, wherein, in response to the safety error being classified as a main domain fatal fault, the safety island domain is configured to:

reset the main domain and instruct, through the vehicle network, safety actions to perform on the vehicle.

10. The processor-based system of claim 6, wherein, in response to the safety error being classified as a main domain non-fatal fault, the safety island domain is configured to:

determine a criticality of the main domain non-fatal fault; and instruct, through the vehicle network, safety actions to perform on the vehicle based on the criticality of the main domain non-fatal fault.

11. The processor-based system of claim 1, wherein the second processor is further configured to receive a low power mode signal, and the second processor, in response to the low power mode signal, is configured to:

continue monitoring safety errors generated from both the main domain and the safety island domain.

12. The processor-based system of claim 1, wherein the second processor is further configured to receive a boot-up signal, wherein, in response to the boot-up signal, the safety island domain is configured to:

electrically and functionally isolate the safety island domain from the main domain; and monitor and recover from non-fatal errors in the safety island domain.

13. A method for controlling operation of a vehicle comprising:

receiving, by a main domain, vehicle information from a vehicle network, the main domain disposed in a system on chip (SoC), the main domain consuming a first area on the SoC;

processing, by the main domain, the vehicle information;

communicating, by the main domain, over the vehicle network to instruct the vehicle how to operate;

receiving independently, by a safety island domain, the vehicle information from the vehicle network, the safety island domain consuming a second area on the SoC, the second area is less than the first area;

processing independently, by the safety island domain, the vehicle information in parallel with the main domain;

checkpointing the vehicle information that compares results of processing performed by the safety island domain with results of processing performed by the main domain for a same processing interval to detect a safety fault; and monitoring safety errors, by the safety island domain, generated by both the main domain and the safety island domain, wherein the monitoring is performed by circuitry residing within the safety island domain.

14. The method of claim 13, wherein, in response to a safety error, the method further comprises:

entering an island mode, by the safety island domain, by electrically and functionally isolating the safety island domain from the main domain; and instructing, by the safety island domain, the vehicle how to operate through the vehicle network and to monitor safety errors generated by both the main domain and the safety island domain.

15. The method of claim 14, wherein entering the island mode further comprises:

generating a single enable isolation signal to simultaneously electrically and functionally isolate the safety island domain from the main domain.

16. The method of claim 13, wherein, in response to a safety error, the method further comprises:

classifying the safety error into a fault class.

17. The method of claim 16, wherein, in response to the safety error being classified as a main domain fatal fault, the method further comprises:

resetting the main domain; and instructing, through the vehicle network, safety actions to perform on the vehicle.

18. The method of claim 16, wherein, in response to the safety error being classified as a main domain non-fatal fault, the method further comprises:

determining a criticality of the main domain non-fatal fault; and instructing, through the vehicle network, safety actions to perform on the vehicle based on the criticality of the main domain non-fatal fault.

19. The method of claim 16, wherein, in response to the safety error being classified as a safety island domain non-fatal fault, the method further comprises:

recovering from the safety island domain non-fatal fault while the main domain continues to control operation of the vehicle.

20. The method of claim 16, wherein, in response to the safety error being classified as a safety island domain fatal fault, the method further comprises:

resetting both the main domain and the safety island domain.

21. The method of claim 13, further comprising:

receiving a low power mode signal; and continuing to monitor safety errors generated from both the main domain and the safety island domain.

22. The method of claim 13, further comprising:

receiving a boot-up signal;

electrically and functionally isolating the safety island domain from the main domain; and monitoring and recovering from non-fatal errors in the safety island domain.

23. A processor-based system deployed as a system on chip (SoC) for controlling operation of a vehicle comprising:

means for receiving, by a main domain, vehicle information from a vehicle network, the main domain consuming a first area on the SoC;

means for processing, by the main domain, the vehicle information;

a first means for communicating, by the main domain, over the vehicle network to instruct the vehicle how to operate;

means for receiving independently, by a safety island domain, the vehicle information from the vehicle network, the safety island domain consuming a second area on the SoC, the second area is less than the first area;

means for processing independently, by the safety island domain, the vehicle information from the vehicle network in parallel with the main domain;

means for checkpointing the vehicle information that compares results of processing performed by the safety island domain with results of processing performed by the main domain for a same processing interval to detect a safety fault; and means for monitoring safety errors, by the safety island domain, generated by both the main domain and the safety island domain, wherein the monitoring is performed by circuitry residing within the safety island domain.

24. The processor-based system of claim 23, wherein, in response to a safety error, the processor-based system further comprises:

means for entering an island mode, by the safety island domain, by electrically and functionally isolating the main domain; and means for instructing, by the safety island domain, the vehicle how to operate through the vehicle network and to monitor safety errors generated by both the main domain and the safety island domain.

25. The processor-based system of claim 24, wherein the means for entering the island mode further comprises:

means for generating a single enable isolation signal to simultaneously electrically and functionally isolate the safety island domain from the main domain.

26. The processor-based system of claim 23, wherein, in response to a safety error, the processor-based system further comprises:

means for classifying the safety error into a fault class.

27. The processor-based system of claim 26, wherein, in response to the safety error being classified as a main domain fatal fault, the processor-based system further comprises:

means for resetting the main domain; and wherein the means for instructing further comprises instructing, through the vehicle network, safety actions to perform on the vehicle.

28. The processor-based system of claim 26, wherein, in response to the safety error being classified as a main domain non-fatal fault, the processor-based system further comprises:

means for determining a criticality of the main domain non-fatal fault; and wherein the means for instructing further comprises instructing, through the vehicle network, safety actions to perform on the vehicle based on the criticality of the main domain non-fatal fault.

29. The processor-based system of claim 26, wherein, in response to the safety error being classified as a safety island domain non-fatal fault, the processor-based system further comprises:

means for recovering from the safety island domain non-fatal fault while the main domain continues to control operation of the vehicle.

30. The processor-based system of claim 26, wherein, in response to the safety error being classified as a safety island domain fatal fault, the processor-based system further comprises:

means for resetting both the main domain and the safety island domain.

31. A non-transitory computer-readable storage medium comprising instructions executable by a processor, which, when executed by the processor, causes the processor to control operation of a vehicle, comprising:

receiving, by a main domain, vehicle information from a vehicle network, the main domain disposed in a system on chip (SoC), the main domain consuming a first area on the SoC;

processing, by the main domain, the vehicle information;

communicating, by the main domain, over the vehicle network to instruct the vehicle how to operate;

receiving independently, by a safety island domain, the vehicle information from the vehicle network, the safety island domain consuming a second area on the SoC, the second area is less than the first area;

processing independently, by the safety island domain, the vehicle information from the vehicle network in parallel with the main domain;

checkpointing the vehicle information that compares results of processing performed by the safety island domain with results of processing performed by the main domain for a same processing interval to detect a safety fault; and monitoring safety errors, by the safety island domain, generated by both the main domain and the safety island domain, wherein the monitoring is performed by circuitry residing within the safety island domain.

32. The non-transitory computer-readable storage medium of claim 31, wherein, in response to a safety error, the non-transitory computer-readable storage medium further comprises:

entering an island mode, by the safety island domain, by electrically and functionally isolating the safety island domain from the main domain; and instructing, by the safety island domain, the vehicle how to operate through the vehicle network and to monitor safety errors generated by both the main domain and the safety island domain.

33. The non-transitory computer-readable storage medium of claim 32, wherein entering the island mode further comprises:

generating a single enable isolation signal to simultaneously electrically and functionally isolate the safety island domain from the main domain.

34. The non-transitory computer-readable storage medium of claim 31, wherein, in response to a safety error, the non-transitory computer-readable storage medium further comprises:

classifying the safety error into a fault class.

35. The non-transitory computer-readable storage medium of claim 34, wherein, in response to the safety error being classified as a main domain fatal fault, the non-transitory computer-readable storage medium further comprises:

resetting the main domain; and instructing, through the vehicle network, safety actions to perform on the vehicle.

36. The non-transitory computer-readable storage medium of claim 34, wherein, in response to the safety error being classified as a main domain non-fatal fault, the non-transitory computer-readable storage medium further comprises:

determining a criticality of the main domain non-fatal fault; and instructing, through the vehicle network, safety actions to perform on the vehicle based on the criticality of the main domain non-fatal fault.

37. The non-transitory computer-readable storage medium of claim 34, wherein, in response to the safety error being classified as a safety island domain non-fatal fault, the non-transitory computer-readable storage medium further comprises:

recovering from the safety island domain non-fatal fault while the main domain continues to control operation of the vehicle.

38. The non-transitory computer-readable storage medium of claim 34, wherein, in response to the safety error being classified as a safety island domain fatal fault, the non-transitory computer-readable storage medium further comprises:

resetting both the main domain and the safety island domain.

* * * * *